Dec. 30, 1969  A. HERTZBERG ET AL  3,487,333
METHOD AND APPARATUS FOR CREATING ELECTRONIC POPULATION
INVERSIONS LEADING TO LASER ACTION BY CONVECTIVE
FLUID MECHANICAL TECHNIQUES
Filed Aug. 25, 1966

INVENTOR.
ABRAHAM HERTZBERG
BY  IAN R. HURLE

AGENT

United States Patent Office 3,487,333
Patented Dec. 30, 1969

3,487,333
METHOD AND APPARATUS FOR CREATING ELECTRONIC POPULATION INVERSIONS LEADING TO LASER ACTION BY CONVECTIVE FLUID MECHANICAL TECHNIQUES
Abraham Hertzberg, Tonawanda, N.Y., and Ian R. Hurle, Chester, England, assignors to Cornell Aeronautical Laboratory, Inc., Buffalo, N.Y., a corporation of New York
Filed Aug. 25, 1966, Ser. No. 575,123
Int. Cl. H01s 3/22
U.S. Cl. 331—94.5                                 5 Claims

ABSTRACT OF THE DISCLOSURE

An apparatus and method for creating laser population inversions having structure for and involving the steps of, exciting helium to an elevated energy level and mixing the excited helium with neon and a gas that promotes quenching such as oxygen in a laser cavity.

---

The present invention relates to a method and apparatus for pumping lasers, and more particularly to a method and apparatus for creating electronic population inversions leading to gaseous lasing.

As is well known, before lasing can occur an upper electronic energy state must contain more atoms than exists in the next optically connected lower state. This condition provides an excess of photons available for the stimulated emission of other upper state atoms over those photons lost through absorption by lower state atoms. Raising atoms to the upper excited energy state by collision with excited exciter atoms is the operational basis of some gaseous lasers.

In the existing gas lasers that are excited by collision, the exciter atoms may be excited by energetic electrons in a discharge, for example, and the discharge electrons also tend to raise the energy state of the active material above the ground state; yet below the desired overpopulated energy state. In other words, the process of populating lower states of the active material by collision with the energetic electrons competes with the population enhancement process of the upper states by collision with the excited exciter atoms. This has the undesirable effect of reducing the degree of inversion in that the population of intermediate states of active material atoms is also being increased.

It is accordingly, an object of the present invention to provide a method and apparatus for improving the degree of inversion in a gaseous laser by separating these competing processes.

Another object of the present invention is to provide a method and apparatus of pumping a gaseous laser by fluid mechanical techniques.

Basically the present invention provides a method and apparatus for isolating the exciter atoms from the active material atoms until the exciter atoms have been substantially fully excited and then bringing them into contact with the active material atoms. In this manner, the excitation of the active atoms to fill intermediate states will be reduced.

Figure 1:
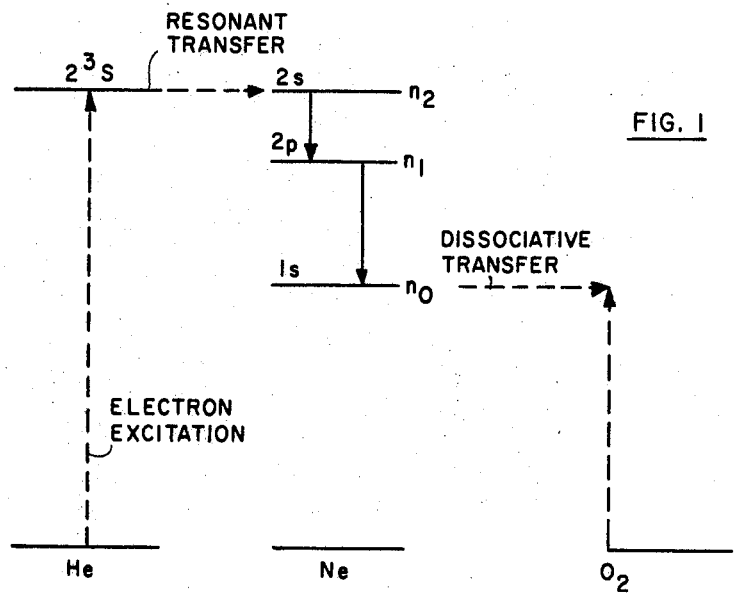
Figure 2:
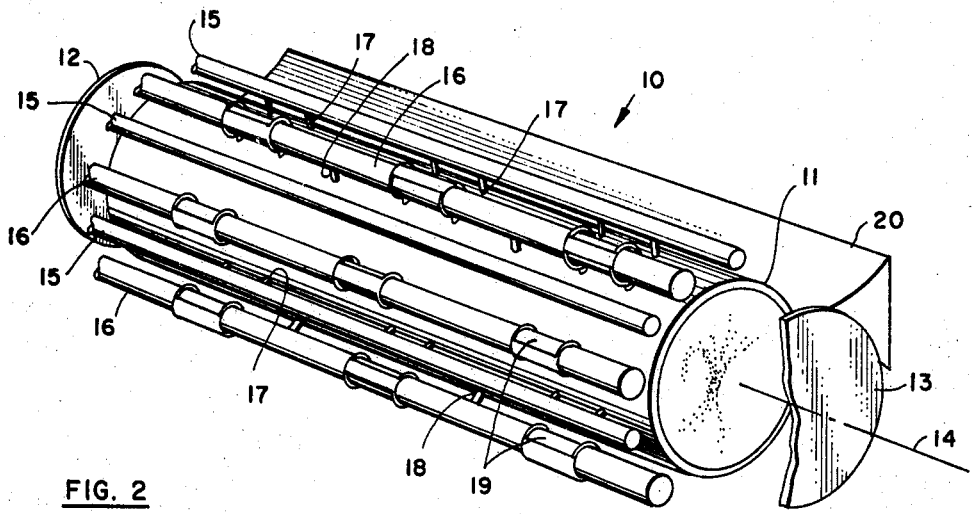

For a fuller understanding of the present invention, reference should be had to the following detailed explanation of the same taken in conjunction with the accompanying drawings wherein:

FIGURE 1 is an energy level diagram of helium, neon, and oxygen as exemplary ingredients employed in the present invention, and FIGURE 2 is a pictorial schematic view of suitable apparatus for carrying out the principles of the present invention.

In many types of gaseous lasers wherein one gas in an excited state, called the exciter gas, transfers its energy by collision to the active gas to overpopulate the upper levels thereof, the efficiency of the overpopulation can be enhanced if the exciter gas is physically separated by some distance from the active gas. The separation may be achieved by a suitable flow system with separate conduits for carrying the exciter gaseous medium and the active material gaseous medium having means to bring the various gases together in a laser cavity whereby lasing can occur.

The particular exciter gases or gaseous mediums can be any gas that can be raised by any form of suitable energy addition means to an excited energy level which will then be capable of preferentially exciting an active material gas or gaseous medium.

The type of active material gas can be any gas that can be raised preferentially to an excited energy level whereat laser action will occur.

The energy excitation for the exciter gas can take any suitable form. For example, an R-F discharge, a chemical reaction, thermal heating, or any combination thereof might be utilized.

By way of example, and not limitation, to illustrate the principles of the invention, the ensuing description has chosen the conventional He/Ne laser. It is to be emphasized that any other suitable gases may be utilized.

In the conventional He/Ne laser, inversion between two excited states of the Ne atom is obtained by preferential energy transfer from metastable He atoms. The two inverted Ne states decay by radiation to a third, lower Ne state which is also metastable. Collisions with electrons, and the absorption of radiation re-excite these Ne metastables to the lower of the two inverted states, thereby increasing the population on that state and so limiting the degree of inversion.

These influences on the Ne metastables were demonstrated by the observation that a larger degree of inversion occurred during the period of decay of the electron energy when the discharge was turned off, thereby indicating that the electron excitation of the Ne metastables is a more limiting process than their self-absorption.

These limitations are significantly reduced according to the present invention by producing the He metastables separately and allowing them to mix with and excite the Ne in the absence of the electron discharge. The lifetime of the metastable He atoms is relatively long, so that a moderately fast flow system would suffice to separate the excitation regions. However, in the case of shorter lived exciter atoms, high velocities or even supersonic flows might be required. In which case, the exhaust duct to be discussed infra, would be a supersonic diffuser. In addition, the discharge process can be adjusted for the most efficient production of He metastables without regard to simultaneous undesirable excitation of the Ne.

In the present He/Ne system, the concentration of metastable Ne will thus be determined mainly by radiative decay from the inverted Ne levels. The resulting over-all reduction in the fraction of metastable Ne permits higher concentrations of He and Ne to be used in that system, with a corresponding gain in the number density of inverted Ne atoms.

A further reduction in the concentration of metastable atoms in accordance with present invention can be obtained by introducing a small amount of $O_2$ or argon to the flow, together with the Ne. This tends to cause preferential quenching of the Ne metastables by dissociative transfer to the $O_2$ or by transfer to the argon molecules.

In FIGURE 1, the $n_1$ values denote the population of the indicated electronic states in atoms/$cm.^3$ and the paths of the various energy-transfer mechanisms sustaining the inversion are represented by the arrows.

Referring now to FIGURE 2, the apparatus for carrying out the present invention is generally indicated by numeral 10, and comprise a cylindrical laser cavity 11 having conventional fully reflecting and partially reflecting ends 12 and 13 respectively, defining an optical axis 14.

A plurality of conduits or manifolds 15 and 16 are circumferentially mounted about cavity 11. The manifolds 15 communicate with cavity 11 by means of a plurality of spaced branch passages 17 and are adapted to contain the active laser material such as Ne and the $O_2$ quenching agent, if used. The Ne or Ne-$O_2$ comes from a suitable source (not shown).

The manifolds 16 communicate with cavity 11 by means of a plurality of spaced branch passages 18 and are adapted to contain the exciting atoms such as He from a suitable source (not shown). Mounted in spaced relation about the manifold 16 are a plurality of conventional shielded R-F electron discharge devices 19.

In operation, the He in manifolds 16 are excited to the metastable state indicated at $2^3S$ in FIGURE 1 by the electrons discharging from devices 19. These metastable He atoms then flow through branch passage 18 into laser cavity 11 where they mix with the Ne-$O_2$ atoms that flow into cavity 11 through passages 17. In cavity 11 the He ($2^3S$) metastables transfer their energy to the Ne atoms by collision therewith to raise their energies to Ne ($2s$) levels which decay by radiation to the Ne ($1s$) metastable level by way of the Ne ($2p$) states. The radiative lifetime of the ($2s$–$2p$) transition is greater than that of the ($2p$–$1s$) transition so that a desired population inversion is obtained between the $2s$ and $2p$ states.

The atoms on the $1s$ metastable state cannot effectively revert to the ground state by radiation, and the $O_2$ mixed with Ne will functiton to quench this state by dissociative transfer. It is noted that the $O_2$ would not function to obtain preferential quenching in the premixed He/Ne laser, since most of the $O_2$ would be dissociated by the discharge.

After the population inversion occurs, lasing action will take place in the conventional manner. Both gases are then convected away through exhaust duct 20 so that the operation will be continuous. As stated earlier, duct 20 may be a supersonic diffuser for high-velocity flows.

Since the lifetime of the He metastables is relatively long (on the order of milliseconds) and since the energetic electrons from the discharge equilibrate in shorter time (on the order of microseconds) there is no danger of undesirable electron excitation of the Ne metastables.

After the gases leave the exhaust duct, the ingredients can be separated by suitable means for recirculation. In this manner, an efficient system can be maintained.

While a preferred manner of carrying out the present invention has been described, other embodiments will occur to those skilled in the art; therefore, it is intended that the invention is to be limited solely by the scope of the appended claims.

What is claimed is:

1. The method of creating an electronic population inversion leading to laser action comprising the steps of:
   (1) exciting atoms of an exciter gaseous medium to an elevated electronic energy level,
   (2) mixing said exciter gaseous medium with a mixture of atoms of an active gaseous medium and a gas that promotes quenching of the lower energy states of said active gaseous medium only after said exciter gaseous medium atoms have been excited, and
   (3) said mixing occurs in a laser cavity having partially reflective and fully reflective end surfaces.

2. The method according to claim 1 wherein said last mentioned gas is oxygen.

3. The apparatus according to claim 4 wherein:
   (4) said exciter gaseous medium is helium, and
   (5) said active gaseous medium is neon.

4. An apparatus for creating electronic population inversions leading to laser action, comprising;
   (1) means for exciting atoms of an exciter gaseous medium of an elevated electronic energy level,
   (2) means for mixing said exciter gaseous medium with the atoms of an active gaseous medium and a gas that promotes quenching of the lower energy states of said active gaseous medium only after said exciter gaseous medium atoms have been excited, and
   (3) laser cavity means having partially reflective and totally reflective end surfaces for receiving therebetween the mixture of exciter and active gaseous mediums.

5. The apparatus according to claim 4 wherein:
   (6) said last mentioned gas is oxygen.

References Cited

UNITED STATES PATENTS 3,302,127    1/1967    Shao-Chi Lin _____ 331—94.5

JOHN KOMINSKI, Primary Examiner